No. 726,985. Patented May 5, 1903.

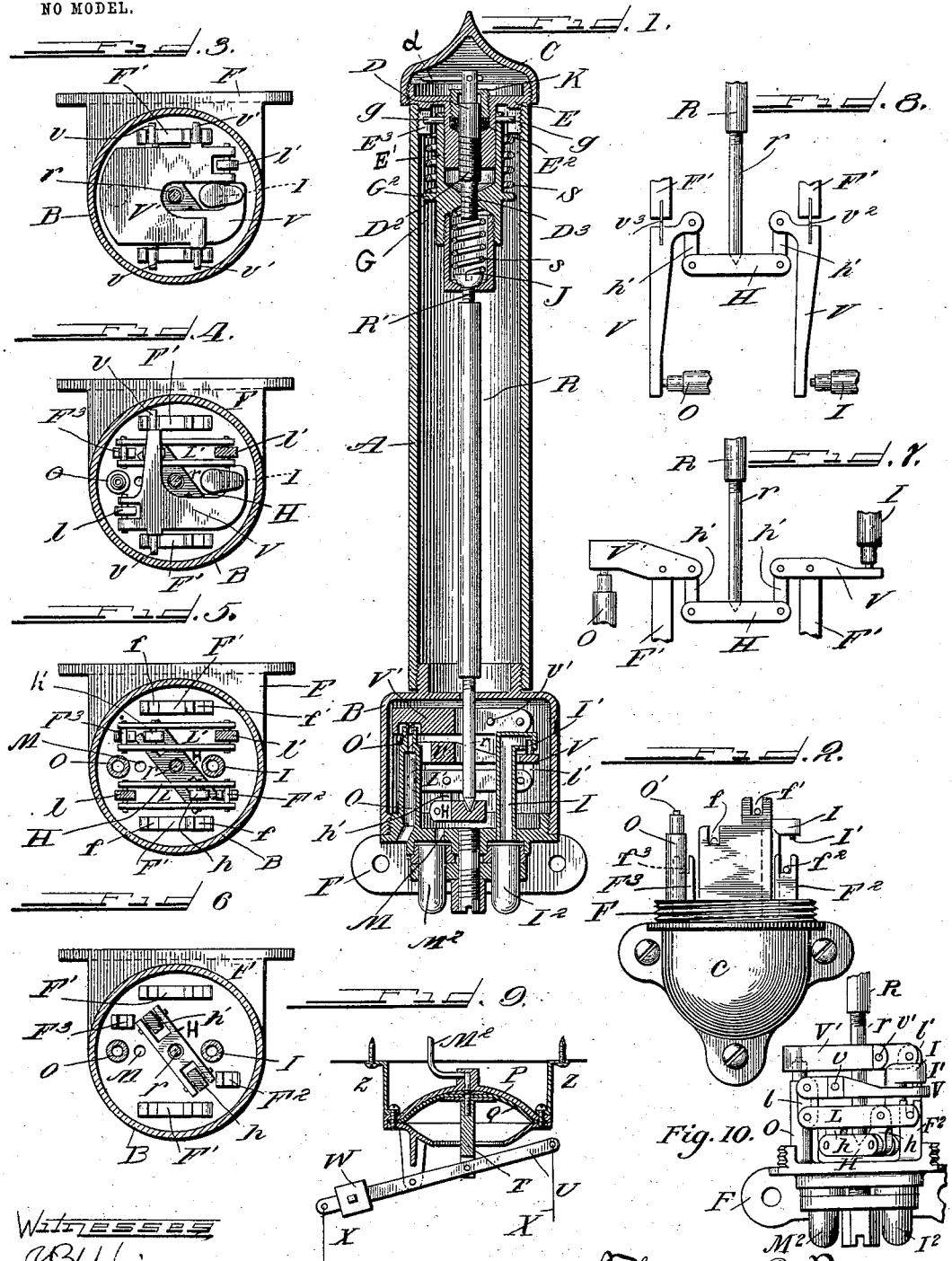

UNITED STATES PATENT OFFICE.

THOMAS O. PERRY, OF CHICAGO, ILLINOIS.

THERMOSTAT.

SPECIFICATION forming part of Letters Patent No. 726,985, dated May 5, 1903.

Application filed November 28, 1900. Serial No. 37,958. (No model.)

*To all whom it may concern:*

Be it known that I, THOMAS O. PERRY, a citizen of the United States, residing at Chicago, in the county of Cook and State of Illinois, have invented a new and useful Thermostat, of which the following is a specification.

My invention relates to improvements in thermostats designed to control the flow of fluid under pressure, so that a slight change of temperature will admit fluid against the piston or diaphragm of a motor and a corresponding reverse change of temperature will cause the fluid to escape from the motor.

The objects of my improvements are, first, to provide for the opening of one valve and the closing of another or the reverse without any appreciable intervening interval, though both valves be actuated by the same slow change of pressure produced by an element elongating or contracting through change of temperature; second, to provide for readily adjusting the thermostat to act closely at any desired temperature by means of an index and coarsely-divided scale. I attain these objects by the mechanism illustrated in the accompanying drawings, in which—

Figure 1 is a front view of the thermostat in sectional elevation. Fig. 2 is a front view of the base, omitting operating parts, and also showing the base-shield c. Fig. 3 is a sectional plan of parts below a plane cutting the thermostat just above the outlet-lever V'. Fig. 4 is a sectional plan of parts below a plane cutting the thermostat just above the inlet-lever V. Fig. 5 is a sectional plan of parts below a plane cutting the thermostat just above the multiplying-levers L L'. Fig. 6 is a sectional plan of parts below a plane cutting the thermostat just above the yoke H. Fig. 7 is a diagraphic illustration of parts essential to the reciprocal action of inlet and outlet valves; and Fig. 8 is another diagraphic illustration of parts essential to the reciprocal action of the two valves, springs being substituted to perform the previous functions of gravity. Fig. 9 shows in sectional elevation, on a reduced scale, an ordinary diaphragm-motor as supported from a ceiling to operate the dampers of a heater by compressed air controlled by the thermostat. Fig. 10 is a front view of the valve-levers, multiplying-levers, and other parts immediately connected with the base.

Similar letters refer to similar parts throughout the several views.

The base F is a fixture usually secured to the wall of a room whose temperature is to be regulated. The cylindrical chamber B is screwed onto the base and serves to inclose the valves and their operating-levers. On the top of chamber B is screwed a thermostatic tube A, made of material sensitive to slight changes of temperature, as hard rubber, so that it elongates with rising and contracts with falling temperature. The upper end of the thermostatic tube is securely closed by a cap E, from which is suspended a transmission-rod R, preferably made of material, as glass or iron, whose rate of expansion and contraction is small as compared with that of the thermostatic tube.

I is an inlet-tube for fluid under pressure and terminates at its upper end in a nozzle or valve-seat I', opening downward on the side.

$I^2$ is an inlet-pipe connecting with the inlet-tube I through the base F, to which both are attached, and is supposed to communicate with a reservoir or source of supply of compressed air or other fluid under pressure.

O is an outlet-tube communicating through the base with the open air and terminating at its upper end in a nozzle or valve-seat O', opening upward.

M is an aperture in the base F in communication with the motor-pipe $M^2$, which is supposed to lead to a motor attached to a radiator-valve or to the damper of a heater of any kind. The motor may be such as is generally used to control steam-heaters, usually consisting of a diaphragm or piston adapted to be moved by fluid-pressure in one direction against a weight or spring, which produces the reverse movement when the fluid-pressure is removed or sufficiently reduced.

V is an inlet-lever fulcrumed between its extremities by means of trunnions $v$, resting in rectangular notches $f$ on the fulcrum-walls F', which project up on both sides from the base F. One extremity of the inlet-lever V, farthest from the fulcrum, reaches around the inlet-tube I and is adapted to close the inlet-nozzle I'. From the opposite end of inlet-lever V hangs a link $l$, which connects at its lower end with one end of the multiplying-lever L, fulcrumed at its opposite end in a rectangular notch $f^2$ on the fulcrum-post F², projecting up from the base. A link $h$ hangs from the multiplying-lever L between its extremities and supports at its lower end by loose suspension one end of the yoke H, whose opposite end is similarly supported and connected by means of suspension-link $h'$, multiplying-lever L', and link $l'$, with one end of the outlet-lever V' located above the inlet-lever V and similarly fulcrumed by means of trunnions $v'$, resting in rectangular notches $f'$ on the fulcrum-walls F'. The opposite end of the outlet-lever V' farthest from the fulcrum is adapted to rest upon and close the outlet-nozzle O', for which purpose this outlet-lever is made sufficiently heavy and much heavier than the inlet-lever, whose weight tends to unseat it from the downwardly-opening inlet-nozzle.

In the upper face of the yoke H between its suspended extremities is a conical depression, in which rests the conical lower end of the thrust-pin $r$, which screws into and forms an adjustable lower extremity of the transmission-rod R. Now it is evident that a downward pressure of the thrust-pin $r$, such as will occur when the thermostatic tube A contracts, will tend to close the inlet I, which otherwise is naturally open through the action of gravity on inlet-lever V, and that while this same pressure also tends to unseat the outlet-lever and open the outlet, yet on account of its superior weight the outlet-lever will not be unseated as long as the inlet-lever is free to move toward the inlet-nozzle; but immediately after this closing movement of the inlet-lever is arrested by contact with the nozzle I' any further downward movement of the pressure-pin $r$ will open the outlet. Then a continuous upward movement of the pressure-pin $r$ first allows the outlet-lever to seat itself on the nozzle O', immediately after which seating, and not before, the inlet-lever becomes free to unseat itself. Thus the unseating of each lever or valve immediately follows and is dependent upon the seating of the other. The inlet and outlet valves or levers are reciprocal in their action. The expansion or contraction of the thermostatic tube A due to changing temperature is characteristically slow and in practice continuous during the period of closing and opening of the valves, yet this reciprocal arrangement insures without auxiliary aid a succession of action between the two valves without appreciable interval of time during which the temperature can materially change. Theoretically there is no time interval between the closing of either valve and the opening of the other, notwithstanding the very slow movements, and in practical use experience has shown that a reversal of the movements of the two valves sufficient for actual requirements is accomplished by a change in atmospheric temperature of only a small fraction of one degree Fahrenheit. When the inlet-valve opens, compressed air is admitted to the interior of chamber B and passes directly to the motor designed to be operated thereby by way of the pipe M², and when the outlet-valve opens the air escapes from the motor. As neither valve can open before the other is fully closed, there is no waste of compressed air and only so much is used as the motor requires at each admission. In Fig. 7 the reciprocal action of the two valves is illustrated diagraphically. Here for the sake of simplicity the multiplying-levers L L', which only serve to increase sensitiveness, are omitted and corresponding parts are developed for clearer view. In Fig. 8 a different diagraphic arrangement illustrating the same reciprocal action is shown. Here both nozzles point in the same horizontal direction, while the valve-levers are both vertical. The inlet-valve is normally held open by a spring $v^2$, which also serves as a fulcrum for the lever V. The outlet-valve is normally held closed by the spring $v^3$, also acting as a fulcrum for the lever V'. Fulcrum-spring $v^3$ is made to offer more resistance than fulcrum-spring $v^2$, so that the pressure of the thrust-pin $r$ cannot unseat the outlet-lever V' before the inlet-lever V is well seated, or if both fulcrum-springs offer equal resistance the same result is obtained by letting the thrust-pin $r$ press the yoke H at a point nearer its right-hand end.

It is obvious that various other modifications of form might be made without affecting the principle of reciprocal action, that the rod R might act with a pull instead of a thrust, and that the respective functions of the two valves might be reversed.

If the nozzle O' should be made the inlet and I' the outlet, the inlet-pipe I² should be transferred to communicate with the tube O. The opening of valve V and closing of valve V' would occur with rising temperature, and the reverse movements would occur with falling temperature the same as before; but the motor would be so connected with the heat-controlling valve or valves as to shut off heat with rising temperature whichever of the two thermostatic valves be made inlet or outlet. It is also obvious that the pipe I² might communicate with a vacuum-chamber instead of with a source of compressed air. As the thermostatic tube A is preferably made of hard rubber on account of the extreme sensitiveness of this material to changes of temperature, with its walls made quite thin for greater sensitiveness, and as hard rubber is also very elastic it is evident that the thermostatic tube is elongated whenever air under pressure is admitted to its interior by the opening of valve V and that it contracts when the interior pressure is relieved by the opening of the valve V'; but if the functions of the two thermostatic valves be reversed, making nozzle O' inlet and I' outlet, or if the pipe I² be made to communicate with a vacuum-chamber, then the thermostatic tube will contract because of the reduction of interior pressure when valve V opens and will elongate through increase of interior pressure when valve V closes and valve V' opens. These elongations and contractions of the tube A through changes of temperature and the elongations or contractions due to changes of interior pressure may serve either to augment the elongations and contractions due to temperature or the reverse, as desired. In one case a quicker and more positive action of the motor is secured, while in the other case the initial action of the motor due to change of temperature is retarded by the counteracting influence due to consequent change of interior air-pressure in the thermostat, and these accelerations and retardations affect the movements of the motor in both shutting off and turning on heat, because the two thermostatic valves are both inclosed in an air-tight chamber, of which the elastic thermostatic tube forms a part. The importance of prompt and complete action of the motor is seen in ordinary steam-heating by means of radiators whose shut-off valves should always be either wide open or tightly closed and which cannot be either closed or opened by a too gradual movement without danger of causing the radiators to fill with water. On the other hand, in most other heating devices other than by steam-radiators it is preferable that the thermostat should effect a gradual and slow action of the motor, and where the motor controls the valves for mixing hot and cold air blasts in proper proportions it is even considered essential that the valves governing the hot and cold air blasts shall neither open nor close too suddenly. Others have found it necessary to devise, in connection with their thermostats, special auxiliary devices to accelerate or retard the action of their heat-controlling motors in order to adapt them to various requirements. My invention effects without additional parts either acceleration or retardation of the motor's action in both directions, as desired and as is necessary in some cases. The intensity of these accelerations or retardations depends upon the size of the thermostatic tube A, the thickness of its walls, and the degree of air-tension used in operating the motor. As neither valve can open before the other is fully closed, it is evident that no compressed air is wasted. When the inlet-valve opens, only so much air can pass through as suffices to drive the motor diaphragm or piston to its limit, and when the outlet-valve opens the air contained in the motor-chamber passes out and no more. Hence a very small air-compressor suffices for supplying a large number of thermostats; but in this connection a still more important consideration is the fact that the amount of compressed air coming in contact with the interior of the sensitive tube is thus rendered too small in quantity to materially affect the temperature regulation, for it is evident that any considerable quantity of compressed air circulating within the interior of the thermostatic chamber would affect the operation adversely, as it is generally not practicable to keep the compressed air at constant temperature or at the same temperature as the air of the room whose temperature is to be regulated.

Between the interior of the sensitive tube and the valve-chamber is a horizontal separating-partition through which the lower end of the thrust-rod passes loosely enough to avoid friction, yet closely enough to prevent material circulation in the compressed-air tube. Circulation of the compressed air within the sensitive tube is undesirable, as its temperature is not regulated and might adversely affect the regulation of the exterior air, by which alone the temperature of the tube should be affected, and yet there is sufficient leakage of air through the partition around the rod to keep the air within the sensitive tube the same as in the valve-chamber.

For adjusting the thermostat to different temperatures the rod R might be simply screwed into the cap E and project above for convenient manipulation; but with such arrangement it requires a screw-thread unattainably fine to render the torsional movement sufficiently marked for a ready adjustment corresponding to a desired change of one degree in temperature. Therefore instead of directly screwing the rod R into the cap E I make use of differential screws cut on an adjusting-rod D. The lower end $D^3$ of the rod D is reduced and threaded for a short distance, and just above the reduced part the rod is threaded a further short distance with a screw-thread $D^2$ coarser than that on the reduced part. The upper threaded part $D^2$ is screwed through the lower end of a cylindrical boss E', extending down from cap E. The reduced threaded part $D^3$ is screwed into a cylindrical guide G, whose upper end is chambered to surround and slide vertically on the boss E', but which is kept from rotating by guide-pins $g$, projecting outwardly therefrom on opposite sides and entering vertical slots $E^3$, cut in the lower periphery of the cap E. A circular shoulder $G^2$ surrounds the guide G, between which shoulder and the lower periphery of cap E a coiled take-up spring S reacts. Into the lower end of guide G is screwed a chambered plug J, within which is a coiled safety-spring $s$, which presses down upon the semispherical head of a screw R', resting upon the interior conical surface at the bottom of the chamber. The shank of the screw R' reaches loosely through the bottom of the plug and screws tightly into the top of the rod R. The upper end of the adjusting-rod D passes through a packing-box in the upper part of the cap E, formed by screwing the gland K against the packing $E^2$. The top of rod D projects above the gland K and has attached thereto a suitable index $d$. The upper periphery of cap E may be graduated and marked to correspond with degrees Fahrenheit for convenience in setting the index so as to obtain any temperature desired. The cover C, screwed on over cap E, serves to guard against accidental interference with the adjustment of the index d. The packing-box could be dispensed with if cover C should be screwed on so as to be air-tight. The threads $D^2$ and $D^3$ are both left-handed, as shown, so that when the adjusting-rod D is turned a complete revolution the rod R is moved vertically a distance equal to the difference between the pitch of the two threads $D^2$ and $D^3$, which difference evidently may be of any required minuteness without the necessity of making the threads very fine. For instance, if $D^2$ has thirty-two threads and $D^3$ has thirty-six threads to the inch one complete revolution of the adjusting-rod would make the rod R move vertically a distance $\frac{1}{32} - \frac{1}{36} = \frac{1}{288}$ inches, and if the index d is turned one-sixteenth of a revolution a change of temperature of about 1° Fahrenheit is effected by the thermostat as constructed. It matters not, so far as results are concerned, which of the two threads $D^2$ and $D^3$ is the finer or whether both be right-hand or both left-hand threads; but as the vertical movement of the rod R, corresponding to a degree of change of temperature is very minute, it is evident that any lost motion on account of looseness of threads might allow a greater vertical movement of the rod R than would be due to so small a change of temperature, and friction of the packing-box or elsewhere might prevent a portion of the vertical movement desired whenever the torsional movement of the adjusting-rod is in a direction to release pressure against the threads. Therefore the take-up spring S is used to take up any lost motion which might otherwise result from frictional resistance to vertical movement either of the adjusting-rod D or of the guide G. As it is not practicable to make very coarse adjustments with the differential screws, the thrust-pin $r$ is screwed tightly into the lower end of the rod R, so that it may be screwed in or out for primary adjustment. The safety-spring $s$ serves to prevent excessive or damaging strains on the rod R and other operating parts when the thermostat is subjected to abnormal changes of temperature, especially such as it may encounter in extremely cold weather when not in use. The semi-spherical head of the screw $R'$ allows the rod R to easily adjust itself to place without side strains, which might cause friction, and the aperture in top of chamber B, through which the thrust-pin $r$ passes without touching, is yet sufficiently close to prevent any material circulation of compressed air or other operating fluid in contact with the interior wall of the thermostatic tube A, whose temperature should be changed only by contact of its exterior wall with the atmosphere outside. The transmission-rod R in normal use practically retains a constant temperature on account of its interior location, so that practically the tube A alone constitutes the thermic motor, and its expansion and contraction are nearly as effective as if the interior connections underwent no change of length. The pipes $I^2$ and $M^2$ are usually carried back and led within a partition-wall to their respective destinations, and a shield $c$ may hide from view their connections with the base of the thermostat.

The nozzles or valve-seats I' and O' are preferably made of quite soft metal, while the metal surfaces which seat against these nozzles on the valve-levers V and V' should be perfect planes and much harder, so that some lateral displacement will not cause leakage and the soft nozzles will tend by pressure and wearing to fit the hard plane surfaces more perfectly.

The fulcrums for trunnions $v$ and $v'$, as well as the fulcrums of the multiplying-levers, are all flat-bottomed open notches, in which the trunnions and pivots have lateral play and can roll. The open notches greatly facilitate assembling and repairs, as they enable all the levers and links to be placed in position or removed without disturbing their connections with each other.

It will be noticed that herein the words "induction" and "exhaust" are sometimes used to distinguish the ports controlled by the valves in lieu of the words "inlet" and "outlet," respectively.

What I claim as my invention, and desire to secure by Letters Patent, is—

1. The combination with a casing and two valves controlling the inlet and outlet thereof, of a thermic motor having a responsive member exposed to the atmosphere and forming a portion of the inclosing wall of said casing and mechanical connections between said motor and said valves responsive to a gradual push or pull of the motor in either direction to positively close one of said valves before the opening of the other, substantially as described.

2. The combination with a casing and two valves controlling the inlet and outlet thereof, of a thermic motor having a responsive member exposed to the atmosphere and forming a portion of the inclosing wall of said casing and interdependent mechanical connections between said valves and said motor responsive to the action of the motor in either direction to positively close one valve and positively open the other, the opening of either valve being effected through its connections with the other and the motor so that its opening follows and depends upon the closing of the other without appreciable interval, substantially as described.

3. In a thermostat, the combination with a thermic motor having a responsive member exposed to the atmosphere, of a casing having a portion of its inclosing wall formed by said responsive member, an inlet and an outlet valve therefor, valve-operating mechanism within said casing and mechanical connections between said thermic motor and said valve-operating mechanism for positively closing one of said valves before opening the other, substantially as described.

4. The combination with a casing and two valves controlling the inlet and outlet thereof, of a thermic motor having an expansive member responding to heat and pressure and forming a portion of the inclosing wall of said casing and reciprocal connections between said thermic motor and said valves whereby a pull or push of the responsive member in contracting or expanding tends to open one valve and close the other, the time of the opening of either valve being determined by and dependent upon the closing of the other, substantially as described.

5. The combination with a casing and outlet and inlet valves therefor, of a thermic motor having a sensitive member forming a part of said casing and expansible under heat and pressure, and connections between said sensitive member and said valves for closing either of said valves before opening the other.

6. The combination with a casing and outlet and inlet valves therefor, of a thermic motor having a sensitive member forming a part of said casing expansible under heat and pressure, valve-operating mechanism in said casing, and connections between said thermic motor and said valve-operating mechanism for closing one of said valves before opening the other.

7. The combination with a casing, of an inlet-port adapted to be connected with the supply, an outlet-port opening to the atmosphere, a pipe leading to the motor, valves within said casing and controlling said inlet and outlet ports, and a thermic motor to operate said valves so as to close one before opening the other, said motor forming a part of said casing, substantially as described.

8. The combination with a casing, of an inlet-port and an outlet-port, valves within said casing to open and close said ports, a responsive tube forming part of said casing, and a mechanical connection between said tube and valves, said connection and valves being within said casing and arranged to close one before opening the other, substantially as described.

9. The combination with a casing, and outlet and inlet valves therefor, of a thermic motor having a sensitive member forming a part of said casing and connections between said sensitive member and said valves for closing either of said valves before opening the other, substantially as described.

10. In a thermostat, the combination with the base, F, the casing, B, and the valve-levers, V and V' having trunnions $v$, $v'$, of the fulcrum-walls, F', on the base having the open fulcrum-notches, $f$, $f'$, the construction and arrangement being such that the trunnions, $v$, $v'$, of the valve-levers may be let down into place and retained from displacement by the casing, B, when screwed onto the base, substantially as described.

11. In a thermostat, the combination with the casing B, base, F, having posts, I, O, valve-levers, V, V', multiplying-levers, L, L', and connecting parts, of the fulcrum-walls on the base, F', having open fulcrum-notches, $f$, $f'$, and the fulcrum-posts, $F^2$, $F^3$, having open fulcrum-notches $f^2$, $f^3$, the arrangement being such that the trunnions of the valve-levers and fulcrums of the multiplying-levers may be let down into place and all retained from displacement by the casing when screwed into the base, substantially as described.

12. In a thermostat, the combination of a cylindrical casing provided with a motor, an eduction and an exhaust port, with valve-levers in said casing having portions extending transversely thereof, said levers having movement in parallel planes and being located one on each side of a diameter of the casing, a yoke connecting the oppositely-directed ends of said levers and means for transmitting motion to said yoke, substantially as described.

13. The combination with a thermally-sensitive tube also responsive to pressure, of a casing of which said sensitive tube forms a part and provided with an induction and exhaust port, valves within said casing controlling said induction and eduction ports, and reciprocal connections between said valves and tube to simultaneously open one valve and close the other upon the expansion or contraction of the tube, the actual opening of either valve immediately following and depending upon the closing of the other, substantially as described.

14. The combination with a thermally-sensitive tube also responsive to pressure, of a casing of which said sensitive tube forms a part, and provided with an induction and an exhaust port, valves within said casing for said ports, and connections from the remote end of the tube to each of said valves, said connections being interdependent so that the prior closing of one of the valves is essential to the subsequent opening of the other, substantially as described.

15. The combination with a thermally-sensitive tube also responsive to pressure, of a casing of which said tube forms a part and provided with an induction and exhaust port, two valves within said casing one for each port, and interdependent connections between said valves and the remote end of the tube to close one valve and open the other upon the expansion or contraction of the tube, the opening of either valve being effected through its connections with the other so that its opening follows and depends upon the closing of the other without appreciable interval, substantially as described.

16. The combination with a thermally-sensitive tube also responsive to pressure, of a casing of which the tube forms a part and provided with an induction and an exhaust port, valves in said casing for said ports, one of which valves is normally held open and the other normally held closed by a weight or elastic force, and interdependent connections between the sensitive tube and valves to cause one valve to open by reason of the closing of the other upon the expansion or contraction of the tube, substantially as described.

17. In combination with a heat-controlling motor adapted to be operated by fluid under pressure and a source of compressed fluid, a thermostat adapted to admit and discharge pressure fluid to and from said motor, said thermostat consisting of a closed casing whose walls either wholly or in part are composed of elastic material sensitively adapted to expand and contract with changes of pressure and of external temperature, an inlet-port and an outlet-port opening within said closed casing, an inlet-valve and an outlet-valve inclosed within said casing and adapted to close said inlet and outlet ports, connections between said inlet and outlet valves and a remote part of the interior wall of said casing to cause one of said valves to open when the other is closed by the expansion or contraction of the walls of said chamber, and a fluid-duct leading from said closed thermostatic chamber to said motor, substantially as described.

18. In combination with a heat-controlling motor adapted to be operated by fluid under pressure and a source of compressed fluid, a thermostat adapted to admit and discharge pressure fluid to and from said motor, said thermostat consisting of a closed casing whose walls either wholly or in part are composed of elastic material sensitively adapted to expand and contract with changes of pressure and external temperature, an inlet-port and an outlet-port opening within said closed casing, an inlet-valve and an outlet-valve inclosed within said casing and adapted to close said inlet and outlet ports, a yoke connecting said valves, connections between said yoke and a remote part of the wall of said casing to open one of said valves when the other is closed by the expansion or contraction of the walls of said chamber, and a fluid-duct leading from said closed thermostatic chamber to said motor, substantially as described.

19. In combination with a heat-controlling motor adapted to be operated by fluid under pressure and a source of compressed fluid, a thermostat adapted to admit and discharge pressure fluid to and from said motor, said thermostat consisting of a closed casing whose walls either wholly or in part are composed of elastic material sensitively adapted to expand and contract with changes of pressure and external temperature, an inlet-port and an outlet-port opening within said closed casing, an inlet-valve and an outlet-valve inclosed within said casing and adapted to close said inlet and outlet ports, one of said valves being normally pressed open and the other normally pressed against its seat, a yoke whose extremities connect with said valves, a connecting-rod joining some remote part of the wall of said casing with said yoke at a point between its extremities, the arrangement being such that the expansion or contraction of said casing-wall tends to move one valve toward and the other away from its seat and seats one valve before opening the other, and a fluid-duct leading from said closed thermostatic chamber to said motor, substantially as herein set forth.

20. In combination with a heat-controlling motor adapted to be operated by fluid under pressure, and a source of compressed fluid, a thermostat adapted to admit and discharge pressure fluid to and from said motor, said thermostat consisting of a closed casing whose walls either wholly or in part are composed of elastic material sensitively adapted to expand and contract with changes of pressure and external temperature, an inlet-port and an outlet-port opening within said closed casing, an inlet-valve and an outlet-valve inclosed within said casing and adapted to close said inlet and outlet ports, one of said valves being normally pressed open and the other normally pressed against its seat, connections between said valves and a remote part of the wall of said casing the arrangement being such that the expansion or contraction of said casing-wall simultaneously presses one valve toward and the other away from its seat and causes the closed valve to open by seating the other, and a fluid-duct leading from said closed thermostatic casing to said motor, substantially as described.

21. In combination with a heat-controlling motor adapted to be operated by fluid under pressure, and a source of compressed fluid, a thermostat adapted to admit and discharge pressure fluid to and from said motor, said thermostat consisting of a closed casing whose walls either wholly or in part are composed of elastic material sensitively adapted to expand and contract with changes of pressure and external temperature, an inlet-port and an outlet-port opening within said closed casing, an inlet-valve and an outlet-valve inclosed within said casing and adapted to close said inlet and outlet ports, an inlet-lever fulcrumed at one extremity and carrying said inlet-valve at its other end, an outlet-lever fulcrumed near one end and carrying the outlet-valve at the other end, a yoke connecting at its extremities with said inlet and outlet levers, a connecting-rod joining a remote part of the wall of the closed casing with said yoke at a point between its extremities the arrangement being such that the pressure between the yoke's extremities tends to unseat one valve after seating the other, and a fluid-duct leading from said closed thermostatic casing to said motor, substantially as herein set forth.

THOMAS O. PERRY.

Witnesses:
G. L. ANDREWS,
WILLIAM JAMES HURLBUT.